United States Patent
Wernle et al.

(10) Patent No.: US 12,144,706 B2
(45) Date of Patent: Nov. 19, 2024

(54) ADDITIVE MANUFACTURED DENTAL IMPLANTS AND METHODS THEREOF

(71) Applicant: BIOMET 3I, LLC, Palm Beach Gardens, FL (US)

(72) Inventors: James D. Wernle, Warsaw, IN (US); Esther Moran, Green Acres, FL (US); Elnaz Ajami, Palm Beach Gardens, FL (US); Hai Bo Wen, Lake Worth, FL (US); Cong Fu, Palm Beach Gardens, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 337 days.

(21) Appl. No.: 17/105,314

(22) Filed: Nov. 25, 2020

(65) Prior Publication Data
US 2021/0153982 A1    May 27, 2021

Related U.S. Application Data

(60) Provisional application No. 62/940,562, filed on Nov. 26, 2019.

(51) Int. Cl.
*A61C 8/00* (2006.01)
*A61C 13/00* (2006.01)

(52) U.S. Cl.
CPC .......... *A61C 8/0024* (2013.01); *A61C 8/0051* (2013.01); *A61C 13/0018* (2013.01); *A61C 13/0019* (2013.01)

(58) Field of Classification Search
CPC . A61C 8/0024; A61C 8/0051; A61C 13/0018; A61C 13/0019

USPC .......................................................... 433/174
See application file for complete search history.

(56) References Cited

U.S. PATENT DOCUMENTS

| | | | |
|---|---|---|---|
| 8,100,692 B2 | 1/2012 | Diangelo et al. | |
| 9,271,811 B1* | 3/2016 | Lyren | A61C 8/0018 |
| 2003/0157460 A1* | 8/2003 | Hall | A61C 8/0012 433/174 |
| 2003/0158554 A1* | 8/2003 | Hall | A61C 8/0022 438/584 |
| 2004/0170946 A1* | 9/2004 | Lyren | A61C 8/0012 433/201.1 |
| 2009/0208907 A1* | 8/2009 | Dosta | A61C 8/0009 433/174 |
| 2012/0148983 A1* | 6/2012 | Mullen | B22F 10/28 427/2.26 |
| 2012/0156646 A1* | 6/2012 | Pelote | A61C 8/0012 433/201.1 |
| 2012/0214128 A1* | 8/2012 | Collins | A61L 27/047 433/173 |
| 2012/0315600 A1* | 12/2012 | Perler | A61C 13/0018 264/16 |
| 2013/0022943 A1* | 1/2013 | Collins | A61C 8/0016 433/174 |
| 2013/0209961 A1* | 8/2013 | Rubbert | A61C 8/0036 433/175 |
| 2013/0236854 A1* | 9/2013 | McEntire | A61C 8/0013 433/173 |

(Continued)

*Primary Examiner* — Matthew M Nelson
(74) *Attorney, Agent, or Firm* — Sheridan Ross P.C.

(57) ABSTRACT

A monolithic dental implant formed from an additive manufacturing method can include a non-porous portion and a porous structure. The porous structure can increase osseointegration of the dental implant and increase the secondary stability.

19 Claims, 7 Drawing Sheets

(56) References Cited

U.S. PATENT DOCUMENTS

| | | | | |
|---|---|---|---|---|
| 2015/0320525 A1* | 11/2015 | Lin | ............. | A61C 13/0019 |
| | | | | 264/16 |
| 2016/0015483 A1* | 1/2016 | Kumar | ............. | A61C 13/0003 |
| | | | | 606/301 |
| 2019/0290402 A1* | 9/2019 | Djemai | ............. | A61K 6/822 |
| 2020/0100874 A1* | 4/2020 | Ruetschi | ............. | A61F 2/30767 |
| 2020/0146786 A1* | 5/2020 | Fromovich | ............. | A61C 8/0022 |
| 2022/0133443 A1* | 5/2022 | Lovera Prado | ............. | A61C 8/0033 |
| | | | | 433/174 |
| 2023/0218373 A1* | 7/2023 | Blay | ............. | A61C 13/0004 |
| | | | | 433/201.1 |

* cited by examiner

ADDITIVE MANUFACTURED DENTAL IMPLANTS AND METHODS THEREOF

PRIORITY CLAIM

This patent application claims the benefit of priority, under 35 U.S.C. Section 119, to U.S. Provisional Patent Application Ser. No. 62/940,562, filed on Nov. 26, 2019 and entitled "Additive Manufactured Dental Implants and Methods Thereof," the full disclosure of which is hereby incorporated herein by reference.

TECHNOLOGICAL FIELD

The present disclosure relates to additive manufactured bone implants and methods thereof, and in particular, dental implants including non-porous and porous structures formed by additive manufacturing methods.

BACKGROUND

Dental implants are commonly used as anchoring members for dental restorations to provide prosthetic teeth at one or more edentulous sites in a patient's dentition at which the patient's original teeth have been lost or damaged. Known implant systems include a dental implant made from a suitable biocompatible material, such as titanium. The dental implant is threaded or press fit into a bore which is drilled into the patient's mandible or maxilla at the edentulous site. The implant provides an anchoring member for a dental abutment, which in turn provides an interface between the implant and a dental restoration. The restoration is typically a porcelain crown fashioned according to known methods.

Many current dental implant surgeries are performed in two stages. In the initial or first stage, an incision is made in the patient's gingiva at an edentulous side, and a bore is drilled into the patient's mandible or maxilla at the edentulous site, followed by threading or impacting a dental implant into the bore using a suitable driver. Thereafter, a cap is fitted onto the implant to close the abutment coupling structure of the implant, and the gingiva is sutured over the implant. Over a period of several months, the patient's bone grows around the implant to securely anchor the implant, a process known as osseointegration.

In a second stage of the procedure following osseointegration, the dentist reopens the gingiva at the implant site and secures an abutment and optionally, a temporary prosthesis or temporary healing member, to the implant. Then, a suitable permanent prosthesis or crown is fashioned, such as from one or more impressions taken of the abutment and the surrounding gingival tissue and dentition. In the final stage, the temporary prosthesis or healing member is removed and replaced with the permanent prosthesis, which is attached to the abutment with cement or with a fastener, for example. Alternative single stage implants may be used that extend through the transgingival layer so that the gingiva need not be reopened to access the implant.

One way to improve osseointegration onto the implant, and in turn long term stability of the implant, is to provide a porous material on the implant that the bone can grow into. Such a porous material may also increase short term stability for immediate loading because of its large friction coefficient with surrounding bone.

The dental implant dentistry has evolved rapidly in a variety of implant designs with the goal of forming direct bone to implant contact. Dental implants, parts and relevant tools are traditionally machined from stock materials, and a lot of stock material is wasted during the manufacturing process. In additional, various tools are needed to create different features of the implant systems and the parts, which makes the process time consuming an expensive.

Previous approaches, such as those in U.S. Pat. Nos. 8,899,982 and 8,602,782, illustrate dental implants with a porous intermediate section, a head portion, and an initial separate stem portion, all of which are machined separately, then assembled by a screw-type connection, press fit, welding or similar mechanisms. Clinical studies have shown that these implants are clinically effective with high survival rates under different conditions. However, the current manufacturing process for these types of designs is complex and costly.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

This disclosure pertains, in some aspects, to using additive manufacturing methods to produce dental implants having porous and non-porous structures. As discussed herein, using additive manufacturing methods to form dental implants are simple and cost-effective methods, while still providing the highly effective survival rates of implants including porous structures.

In previous approaches, securing the porous material to the dental implant, can be difficult due to the due to the small size and geometry of the device. Therefore, previous implants including a porous structure have needed to include a locking element to economically secure the porous material in place, while allowing for other features such as threads, abutment interface geometry or reinforcing members.

The present subject matter can overcome these problems, such as by providing a dental implant that includes a porous and non-porous structure that can be formed via additive manufacturing methods. In particular, the additive manufacturing methods provides several advantages. For example, the additive manufacturing methods can duplicate the porous structures made by the traditional manufacturing process and tailor the gradient of porosity and distribution of pores to achieve bone ingrowth while preserving the mechanical integrity of the implant system. The additive manufacturing methods can create various shapes and designs of the dental implants that might not otherwise be available via traditional machining. Additionally, the additive manufacturing methods enables a single piece to be made from the bottom-up. Therefore, it can reduce the cost of tooling, the labor for assembly, and the waste of materials.

In one example, a dental implant can be formed via additive manufacturing methods such that the dental implant is monolithic. As discussed herein, the additive manufacturing methods can be used to form porous and non-porous portions of the dental implant. In one example, the dental implant can be formed via additive manufacturing and subsequently undergo machining, to form other features such as threads, abutment interface geometry, and reinforcing members. In one example, all features can be formed during the additive manufacturing process such that the porous, non-porous, and features such as threads, abutment interface geometry, and any other reinforcing members are formed during additive manufacturing.

In one example, a monolithic dental implant includes a non-porous head portion at a coronal end of the implant, the non-porous head portion having an interior portion extending apically from the head portion, a non-porous apical portion at an apical end of the implant, and a porous middle section positioned between the non-porous head portion and the non-porous apical portion. The porous middle section can include a porous structure. The non-porous head portion, the non-porous apical portion, and the porous middle section are integral with each other and formed via an additive manufacturing method.

In one example, a method of forming a monolithic dental implant is disclosed. The method includes using an additive manufacturing technique to form the monolithic dental implant. The monolithic dental implant includes a non-porous head portion at a coronal end of the implant, the non-porous head portion having an interior portion extending apically from the head portion, a non-porous apical portion at an apical end of the implant, and a porous middle portion positioned between the non-porous head portion and the non-porous apical portion, the porous middle section including a porous structure, wherein the non-porous head portion, the non-porous apical portion, and the porous middle section are integral with each other.

In one example, a monolithic dental implant includes a non-porous head portion at a coronal end of the implant, the non-porous head portion having an interior portion extending apically from the head portion, a non-porous apical portion at an apical end of the implant, and a porous middle portion positioned between the non-porous head portion and the non-porous apical portion. The porous middle portion can include a non-porous section and a porous structure, wherein the non-porous head portion, the non-porous apical portion, and the porous middle portion are integral with each other and formed via an additive manufacturing method.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying figures, in which:

DETAILED DESCRIPTION

Figures 1, 2:
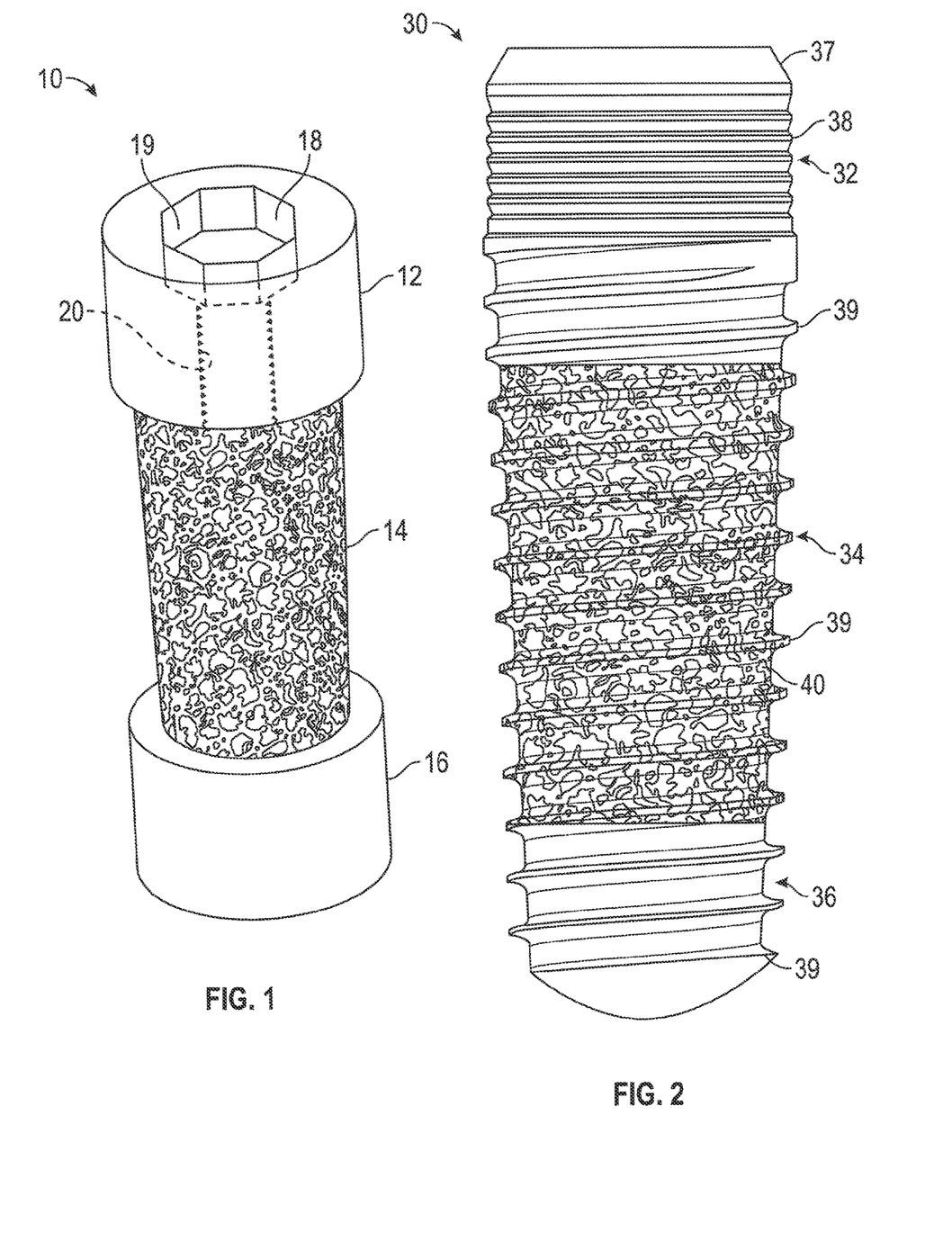
FIG. 1 is a perspective view of a dental implant manufactured via additive manufacturing, according to one example of the present disclosure.
FIG. 2 is a side-view of a dental implant manufactured via additive manufacturing, according to one example of the present disclosure.

Referring to FIG. 1, an implant 10 formed from additive manufacturing methods including a porous and non-porous portion is shown. The implant 10 is a unitary, monolithic implant that includes a cervical portion 12, a middle portion 14, and an apical portion 16. As illustrated, the cervical portion 12 and the apical portion 16 are non-porous and the middle portion 14 is porous. As seen in FIG. 1, the additive manufacturing process was used to form the abutment connection geometry 18 including a non-rotational section 19 to mate with corresponding non-rotational geometry of, e.g., at least one of a healing abutment and an abutment to mate with a temporary or permanent prosthesis. Further, the implant connection geometry 18 includes a threaded bore 20 that can be configured to mate with a screw for coupling the at least one of the healing abutment, temporary prosthesis, and permanent prosthesis. The additive manufacturing methods can be used to form any abutment connection geometry. In one example, the abutment connection geometry 18 can be formed via machining instead of the additive manufacturing methods.

The materials used to produce the implant can be metallic, plastic, inorganic or composite. The surface finish for each part can be either machined only or treated. The surface treatments include, but are not limited to, grit blasting, acid etching, anodization, chemical deposition, and physical deposition. The goals of the surface treatments include enhancing osteointegration, improving soft tissue attachment and reducing bacteria colonization. The cervical portion 12 is illustrated as being solid; however, the cervical portion 12 can be solid, porous, or a hybrid of the two. The porous/solid ratio in the cervical portion 12 can be custom designed based on patient's conditions.

In an example where the cervical portion 12 includes threads, the threads can be either produced by the additive manufacturing process or machined after the additive manufacturing process forms the integral unit including the porous and non-porous portions.

The middle section 14 can be completely porous or partially porous and include a non-porous section and a porous structure. The porous/solid ratio in the middle portion 14 can be custom designed based on the patient's conditions. The porous middle section 14 can be tailored to achieve a design including a porous structure including threads, e.g., that follow the same thread pattern of the rest of the implant for easy insertion, while having the porous ingrowth surface. As discussed herein, if the porous middle section has threads, the threads can either be produced via the additive manufacturing process or by machining.

The structure of the apical section 16 can be solid, porous, or a hybrid. The porous/solid ratio in the apical section 16 can be custom designed based on the patient's conditions. Similar to the other sections, the threads on the apical section 16 can be produced by the additive manufacturing process or machined after the additive manufacturing.

The implant/abutment connection geometry 18, can include, but is not limited to, internal connections, external connections, screw-less connections, and a one-piece dental implant with abutment integrally formed with the dental implant 10.

Besides dental implants, the additive manufacturing methods mentioned in this disclosure can also be used to produce scaffold, healing abutments, definitive abutments, surgical tools, etc.

The implant 10 in FIG. 1, while manufactured via additive manufacturing methods, will undergo further processing such as machining to produce other features of the implant 10, such as threads, cutting flutes, etc. However, as compared to previous approaches, the amount of wasted material is reduced by forming the additional features after the porous and non-porous portions are created as a unitary monolithic unit. Thus, the intricacies of machining the numerous parts of the dental implants to be later connected via fastening means or, e.g., press fit, are eliminated and the cost and complexity of producing a dental implant with a porous and non-porous portion is reduced.

As seen in FIG. 2, dental implant 20 extends from a coronal end to an apical end. The non-porous cervical portion 32 is positioned towards the coronal end, the non-porous apical portion 36 is positioned toward apical end, and the porous middle section 34 is positioned between the non-porous cervical section 32 and the non-porous apical section 36. FIG. 2 illustrates an example where all three portions include an external thread. In one example, the cervical portion 32 can have a tapered collar 37, a micro thread 38, and a macro thread 39. The macro thread 39 along the cervical portion 32 continuously extends along the porous middle section 34 and the non-porous apical end 39. In one example, the macro thread 39 can be the same in all three sections. In other example, the external surface can include more than one thread having different characteristics or each section ca have a different thread profile. In one example, the external surface can include multiple threads.

The porous middle section 34 includes a porous structure 40 that bone can grow into to improve long term stability of the implant device. Such a porous structure 40 may also increase short term stability for immediate loading because of its large friction coefficient with surrounding bone. In one example, the porosity of the porous structure 40 is substantially constant (i.e., substantially uniform) within the middle section 34. In one example, the porosity of the porous structure 40 changes as you move axially along the longitudinal axis. For example, the porosity of the porous structure 40 toward the cervical section 32 can be less than the porosity of the porous structure 40 toward the apical section 36. In one example, the porosity of the porous structure 40 toward the cervical section 32 can be greater than the porosity of the porous structure 40 toward the apical section 36. In a further example, the porosity of the porous structure 40 can be determined based on patient specific factors such that the porosity is non-uniform throughout the porous structure 40.

In additional to changing porosity along the longitudinal axis, the porosity within the porous structure can change in a direction perpendicular to the longitudinal axis. That is, the porosity of the porous structure can increase or decrease as you move from the longitudinal axis towards the external surface. In one example, the external surface can have a lower porosity to increase the durability of the external surface for implantation and the inner portion (closest to the longitudinal axis) of the porous structure 40 can have a greater porosity.

FIGS. 3-8 illustrate various examples of cross-sectional along a porous section 50 of a dental implant including a porous structure 40. The examples in FIGS. 3-8 can be formed via additive manufacturing and include the porous structure 40 to improve osseointegration onto the implant. As discussed herein, the porous section 50 and any non-porous sections or components are formed via the additive manufacturing methods disclosed herein. The additional features such as the threads, cutting flutes, implant connection geometry can be formed during the additive manufacturing process or subsequently formed via machining.

Figure 3:
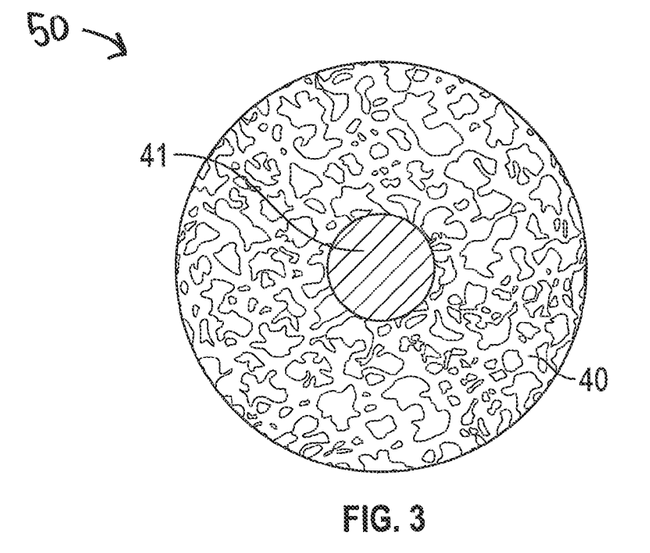
FIG. 3 is a cross-sectional view along a porous section of a dental implant, according to one example of the present disclosure.
Figure 4:
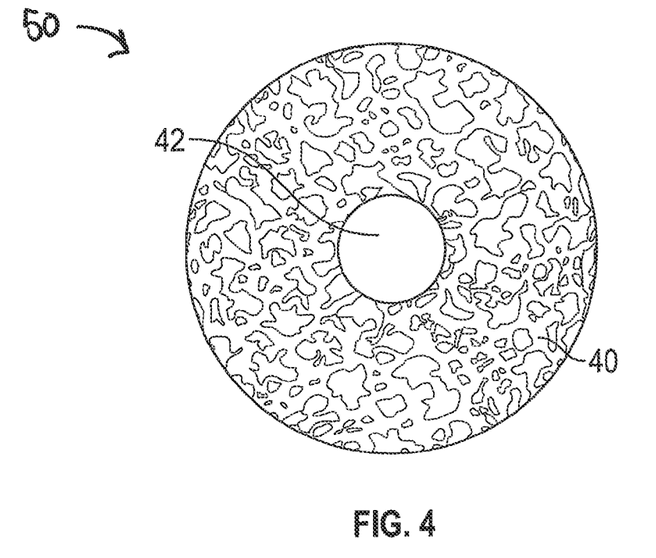
FIG. 4 is a cross-sectional view along a porous section of a dental implant, according to one example of the present disclosure.

In FIG. 3, the porous section 50 is a hybrid and includes a porous structure 40 surrounding a solid core 41. Forming the solid core 41 within the porous structure 40 can be advantageous to increase the stability and strength of the implant along the porous structure 40. In FIG. 4, however, the porous structure 40 defines an internal bore 42. Depending on the type of implant and dimensions of the porous section 50, the porous structure 40 may or may not include the solid core 41, as shown in FIG. 3. In one example, the cross-section of the porous structure 40 is formed entirely of the porous structure 40 and does not include the solid core 41 or the internal bore 42.

Figure 5:
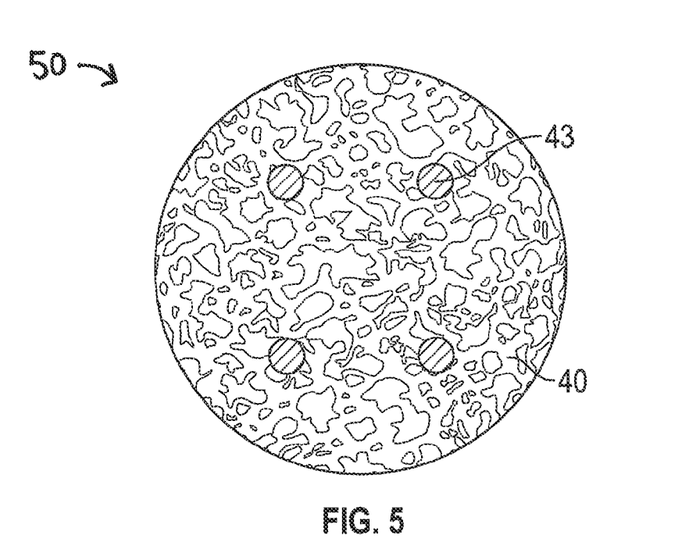
FIG. 5 is a cross-sectional view along a porous section of a dental implant, according to one example of the present disclosure.

FIG. 5 illustrates an example of the porous section 50 including the porous structure 40 and a plurality of solid reinforcement members 43 extending through the porous structure 40. For example, the non-porous stability rods 43 can extend from a non-porous cervical section such as cervical section 32 to a non-porous apical section such as apical section 36. The stability rods 43 can be positioned equidistant around a longitudinal axis to increase the strength of the porous structure while maintaining a large surface area of porous material to maximize osseointegration.

Figure 6:
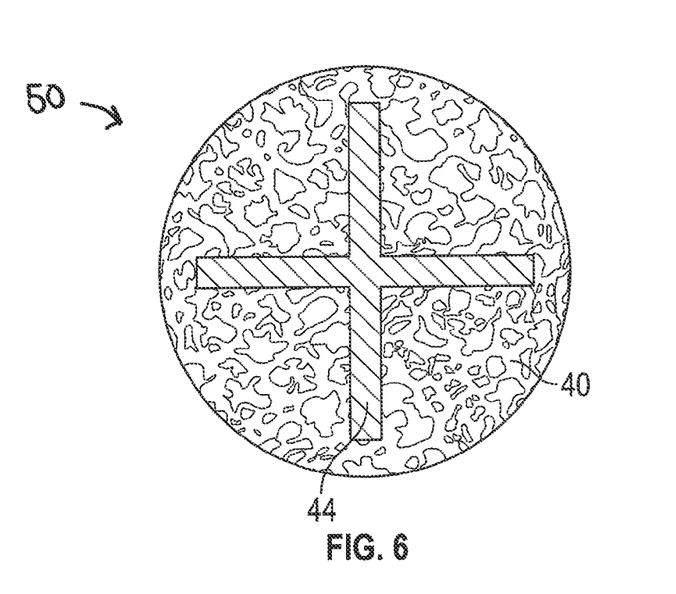
FIG. 6 is a cross-sectional view along a porous section of a dental implant, according to one example of the present disclosure.

FIG. 6 illustrates another porous section 50 including a reinforcement member 44 positioned within the porous structure 40. In the example shown in FIG. 6, the reinforcement member 44 is shaped like a cross and is positioned within the porous structure 40. However, the ends of the arms of the cross-shaped reinforcement member 44 can extend through the porous structure 40 such that a portion of the solid reinforcement member 44 forms a part of the external surface of the porous section 50.

Figure 7:
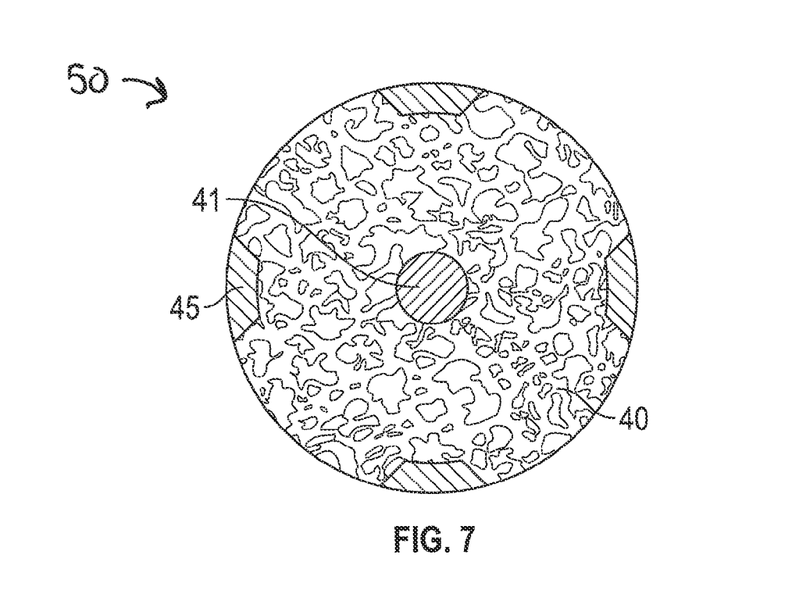
FIG. 7 is a cross-sectional view along a porous section of a dental implant, according to one example of the present disclosure.
Figure 8:
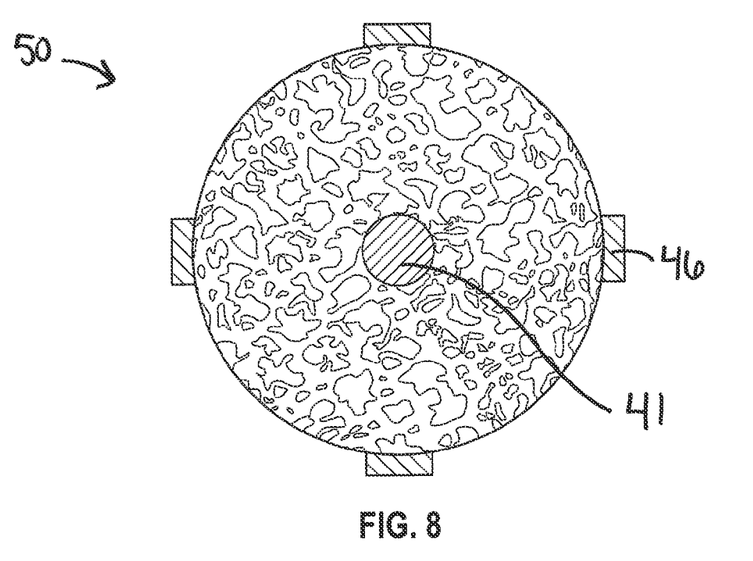
FIG. 8 is a cross-sectional view along a porous section of a dental implant, according to one example of the present disclosure.

FIG. 7 illustrates another porous section 40 including a solid core 40 and a plurality of reinforcement members 45 such that the reinforcement members 45 form a part of the external surface of the porous section 40. As seen in FIG. 7, the reinforcement members 45 are embedded within the porous structure 40 such that an external surface of the solid reinforcement members 45 and an external surface of the porous structure 40 form a perimeter and external surface of the porous section 50. While the external surfaces align, the external surface of the porous structure 40 can extend beyond the external surface of the reinforcement member 45. In another example, the reinforcement member 45 can extend beyond the external surface of the porous structure 40. For example, FIG. 8 illustrates an example where the porous section 50 includes a solid core 41 and reinforcement members 46 that protrude beyond the external surface of the porous structure 40. In one example, the reinforcement members 46 can include threads (see, e.g., FIG. 15). In this example, the reinforcement members 46 provide strength as well an initial stability after insertion due to the threads.

While the sections 41, 43, 44, 45, and 46 discussed in FIGS. 3-8 have been discussed as being non-porous, in one example, these sections 41, 43, 44, 45, and 46 can be porous but have a porosity that is greater than the porosity of the porous structure 40. For example, as the porosity decrease, the strength of can increase. Thus, in the examples illustrated in FIGS. 3-8, sections 41, 43, 44, 45, and 46 can be porous structures having a porosity that is greater than the porosity of the porous structure 40 such that the strength and initial stability of the implant can be increased.

Figure 9:
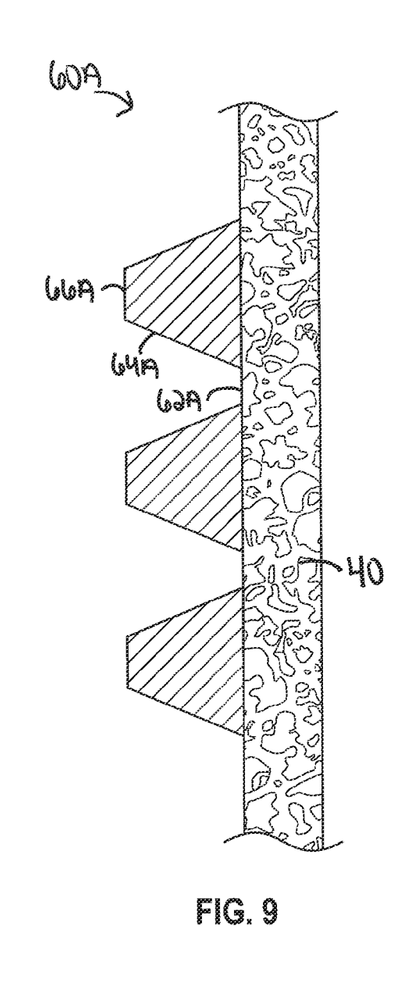
FIG. 9 is a partial cross-sectional view along a thread profile of a dental implant, according to one example of the present disclosure.
Figure 10:
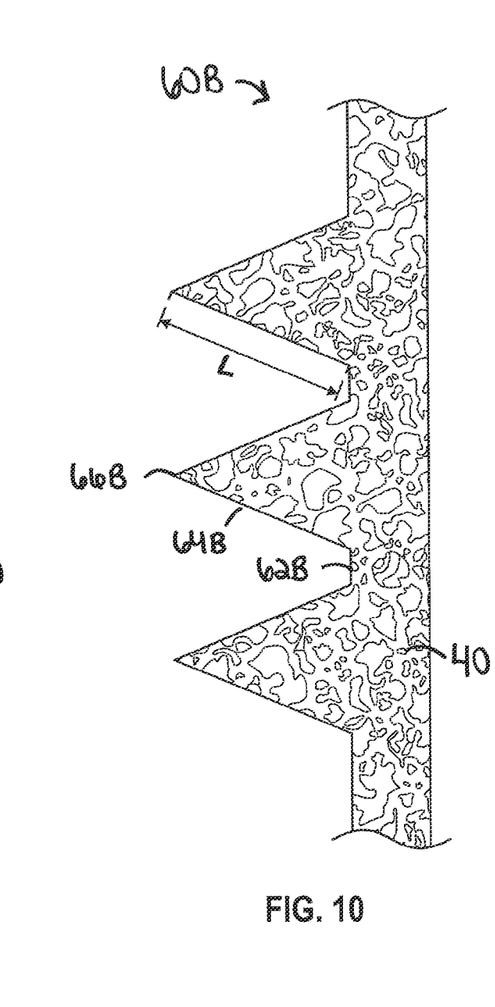
FIG. 10 is a partial cross-sectional view along a thread profile of a dental implant, according to one example of the present disclosure.
Figure 11:
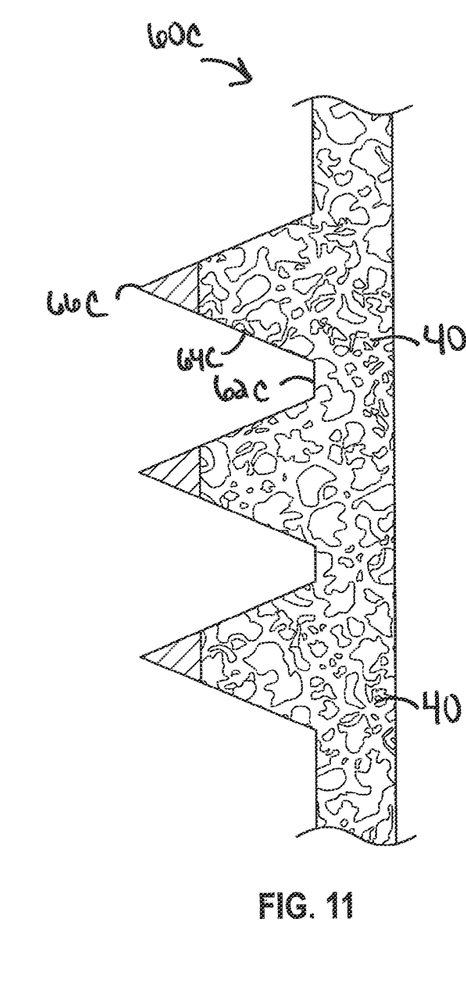
FIG. 11 is a partial cross-sectional view along a thread profile of a dental implant, according to one example of the present disclosure.

FIGS. 9-11 illustrate various examples of thread profiles that can include non-porous and porous sections. A threaded portion of a dental implant can facilitate bonding with bone or gingiva. A thread makes a plurality of turns around the implant. The turns are typically in a helical pattern, as shown in FIG. 1. In certain examples, the threaded portion may include multiple threads, so as to define a multi-lead thread.

FIGS. 9-11 illustrate thread 60A-C, respectively (collectively referred to herein as thread(s) 60), including a root region 62A-C, respectively (collectively referred to herein as root region(s) 62), a flank region 64A-C, respectively (collectively referred to herein as flank region(s) 64), and a crest region 66A-C, respectively (collectively referred to herein as crest region(s) 66). The root region 62 of a turn in the thread 60 is located at a minor diameter with respect to a central axis of the implant, while the crest region 66 is located at a major diameter with respect to the central axis of the implant. The flank region 64 is the surface connecting the root and the crest regions 62, 66. The crest region 66 provides primary stability for the implant by ensuring a secure mechanical connection between the implant and the bone or gingiva. Different implementations of the root, flank and crest regions will be described in detail with respect to FIGS. 9-11. The threaded portion can further include a self-tapping region with incremental cutting edges that allows the implant to be installed without the need for a bone tap.

The root region 62 can be flat, curved, or connected at a point. The crest region 66 can be flat, pointed, or curved. The flank region 64 can be flat or curved. As seen in FIG. 9, the flank region 64A to the crest region 66A is formed of a non-porous material, and the root region 62 is formed of a porous material (see FIG. 13). Thus, the thread 60A is formed of a non-porous material to increase initial stability by the cutting force of the non-porous threads 60, but the integration provided by porous material of the root region 62 increases the secondary level of stability. In one example, the flank region 64A and the crest region 66A can be porous but have a porosity less than the porosity of the root region 62 such that the increases primary stability is still realized.

FIG. 10 illustrates an example where the root region 62B, the flank region 64B, and the crest region 66B are all formed of a porous material. In one example, the porosity of the root region 62B, the flank region 64B, and the crest region 66B are all substantially the same. In another example, the porosity of the root region 62B, the flank region 64B, and the crest region 66B change as you move along the flank region 64B from the root region 62B to the crest region 66B. For example, the flank region 64B is a transition region including a portion of varying porosity in the direction of the crest. For example, in the implementation of FIG. 10, the transition region along the flank region 64B includes a portion of decreasing porosity in the direction of the crest along the length L of the flank region 64B. That is, the porosity of the transition region along the flank region 64B decreases as it approaches the crest region 66B. The transition region between the more porous root region 62B to the less porous crest region 66B can be chosen to minimize interference with the surface of the crest regions 66B, while maximizing osseointegration with the more porous regions along the root and flank regions 62B, 64B.

In the example shown in FIG. 11, the crest region 66C and a first portion of the flank region 64C are non-porous and a second portion of the flank region 64C and the root region 62C are porous. The porous portion of the flank region 64C and the root region 62C can have a uniform porosity or can be gradient. That is, can include increasing or decreasing porosity as you move from the root region 62C toward the crest region 66C.

Figure 12:
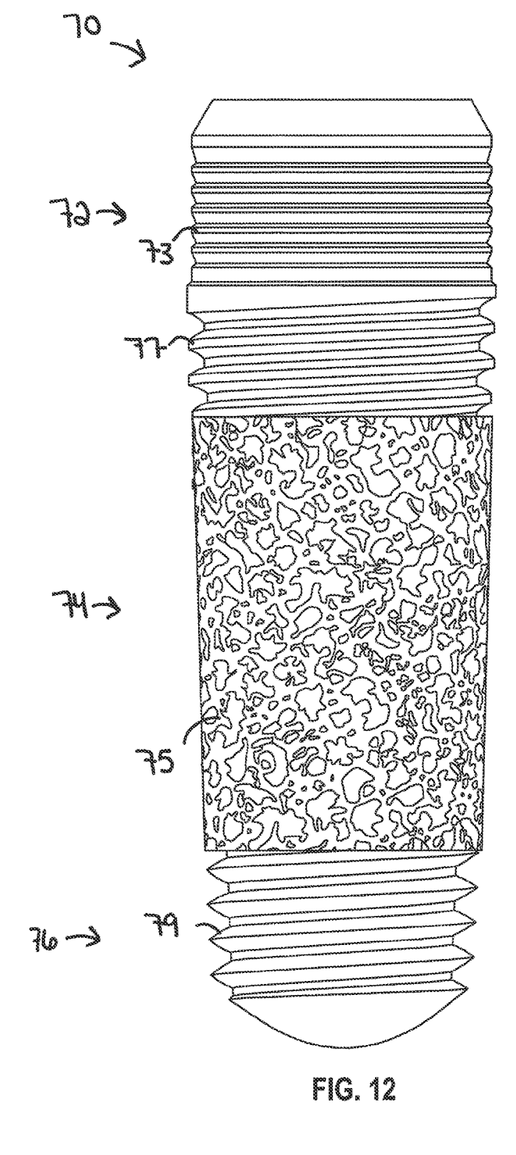
FIG. 12 is a side-view of a dental implant, according to one example of the present disclosure.

FIGS. 12-15 illustrate various examples of the dental implants. FIG. 12 illustrates a dental implant 70 including a cervical section 72, a porous middle section 74, and an apical section 76. The porous middle section 74 includes a porous structure 75 for increasing osseointegration. The porous structure 75 does not include threads. The cervical section 72 can include a micro thread 73 and a macro thread 77. The apical section 76 can include a macro thread 79 that can be the same or different form macro thread 77 on the cervical section 72. The cross-section of the porous middle section 74 can include, but is not limited to, the examples illustrate in FIGS. 3-6.

Figure 13:
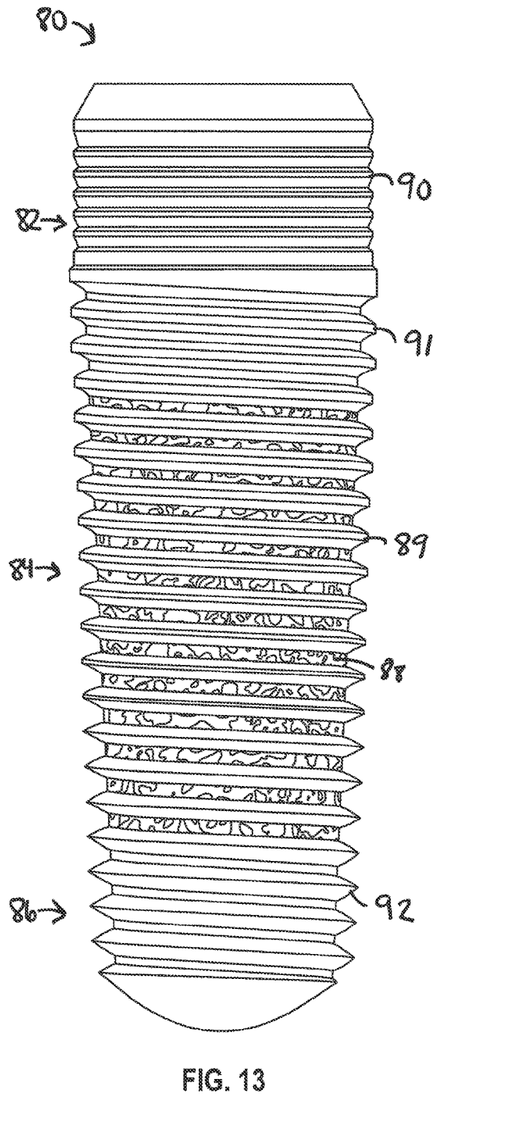
FIG. 13 is a side-view of a dental implant, according to one example of the present disclosure.

FIG. 13 illustrates a dental implant 80 including a cervical section 82, a porous middle section 84, and an apical section 86. The porous middle section 84 includes a porous body 88 and non-porous threads 89. In one example, the porous middle section 84 can include a thread profile as shown in FIG. 9. The cervical section 82 can include a micro thread 90 and a macro thread 91. The apical section 86 can include a macro thread 92. The threads 91, 89, and 92 can be part of the same thread and have the same dimensions along each section.

Figure 14:
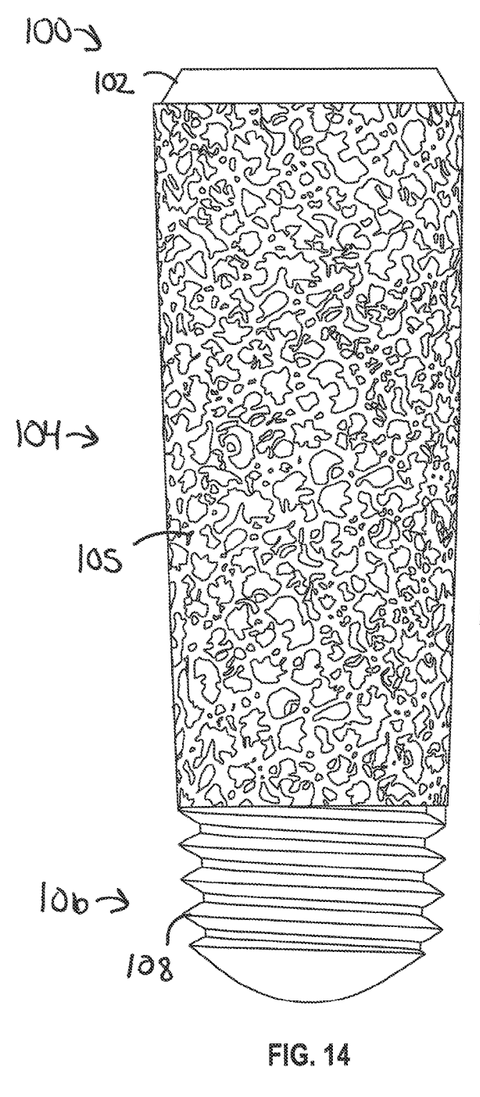
FIG. 14 is a side-view of a dental implant, according to one example of the present disclosure.

FIG. 14 illustrates a dental implant 100 including a tapered collar 102, a porous section 104, and an apical section 106. The porous section 104 includes a porous structure 105 extending from the tapered non-porous collar 102 to the non-porous apical section 106. The apical section 106 can include a thread 108. In this example, the non-porous collar 102 can support a mating component such as a healing abutment, abutment, temporary prosthesis, and permanent prosthesis and the non-porous apical section 106 can help with cutting into the bone for primary stability. The cross-section of the porous section 102 can include, but is not limited to, the examples illustrate in FIGS. 3-6. In an example where the porous structure 105 includes reinforcement members such as reinforcement members 43 in FIG. 5, the non-porous (or less porous) reinforcement member 43 can extend from the non-porous collar 102 to the non-porous apical section 106.

Figure 15:
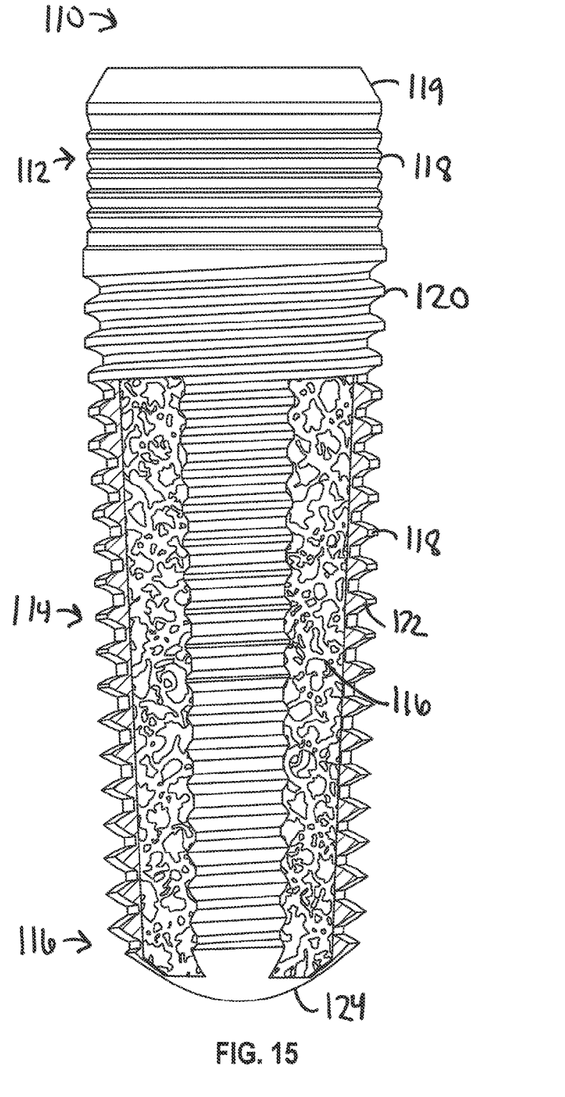
FIG. 15 is a side-view of a dental implant, according to one example of the present disclosure.

FIG. 15 illustrates a dental implant 110 including a cervical section 112, a porous middle section 114, and an apical section 116. The cervical section 112 can include a tapered collar 119, micro threads, and macro threads 120. The apical section 116 can include a non-porous apical tip 124. The porous middle section 114 can include a porous structure 116 and a plurality of non-porous threaded elongate members 118 extending from the cervical section 112 to the apical tip 124. An example of a cross-sectional view along the porous middle section 114 can be shown in FIG. 8. The threads 120 along the cervical section 112 and the threads 122 on the non-porous threaded elongate members 188 can be the same or different.

In some examples, the dental implants including porous and non-porous structures can be a formed from a titanium alloy. In one example, the porous sections of the additive manufacturing process can use an additive manufacturing process, such as with OsseoTi™, which is commercially available from Zimmer Biomet, of Warsaw, Ind. The porous sections can be highly biocompatible, have high corrosion resistance and includes a highly interconnected porous architecture that mimics the porous structure of human cancellous bone, which can enhance bone integration and in-growth. In one exemplary implementation, the porous structures can include a porosity of 70%. The porous structures formed can be formed using a three-dimensional model of cancellous bone material as a template. The template can then be utilized to form any three-dimensionally printable structure, such as the porous structure of dental implant, discussed herein.

In examples, dental implants can be formed with one or more of a variety of materials including but not limited to polymeric materials which are subsequently pyrolyzed, metals, metal alloys, ceramics. In some instances, dental implant can be a fabricated using a selective laser sintering (SLS) or other additive manufacturing-type process such as direct metal laser sintering. In one example, implant is produced in layer-wise fashion from a laser-fusible powder, e.g., a polymeric material powder or a metal powder, that is deposited one layer at a time. The powder is fused, remelted or sintered, by the application of laser energy, or energy from another source, that is directed to portions of the powder layer corresponding to a cross section of the article. After the fusing of the powder in each layer, an additional layer of powder is deposited, and a further fusing step is carried out, with fused portions or lateral layers fusing so as to fuse portions of previous laid layers until a three-dimensional article is complete. In certain embodiments, a laser selectively fuses powdered material by scanning cross-sections generated from a 3-D digital description of the article, e.g., from a CAD file or scan data, on the surface of a powder bed. Net shape and near net shape constructs are infiltrated and coated in some instances. Unfused material can be removed from the completed component. Other types of rapid manufacturing processes can be used to fabricate the interbody implant, such as 3D printing processes. For example, the dental implants disclosed herein can use rapid prototype equipment. It is contemplated that many rapid prototyping techniques may be utilized with the present invention such as: stereolithography, laminated-object manufacturing, selective laser sintering, solid ground curing, or other known rapid prototyping processes.

In one example, a single monolithic dental implant including an abutment can be formed using the additive manufacturing methods disclosed herein. A patient specific abutment can be designed and formed with the dental implant.

The additive manufacturing methods disclosed herein allow for complex geometries to be created, while maintaining the structural integrity and not requiring complex coupling mechanisms to couple porous and non-porous sections together. As discussed herein, the porous structure can increase the osseointegration and secondary stability of the implant and is particularly suited for contacting bone and/or soft tissue. In this regard, the porous structure having a three-dimensional porous structure, or any region thereof, may be fabricated to virtually any desired density, porosity, pore shape, and pore size (e.g., pore diameter). Such structures therefore can be isotropic or anisotropic.

Such porous structures can be infiltrated and coated with one or more coating materials. When coated with one or more biocompatible metals, any suitable metal may be used including any of those disclosed herein such as tantalum, titanium, a titanium alloy, cobalt chromium, cobalt chromium molybdenum, tantalum, a tantalum alloy, niobium, or alloys of tantalum and niobium with one another or with other metals. In various examples, a three-dimensional porous structure may be fabricated to have a substantial porosity, density, pore shape and/or void (pore) size throughout, or to comprise at least one of pore shape, pore size, porosity, and/or density being varied within the structure. For example, a three-dimensional porous structure to be infiltrated and coated may have a different pore shape, pore size and/or porosity at different regions, layers, and surfaces of the structure.

The dental implants can include a non-porous or essentially non-porous portion and can provide foundation upon which a three-dimensional porous structure will be built and fused thereto using a selective laser sintering (SLS) or other additive manufacturing-type process.

The rapid manufacturing processes can be used to include a desired level of porosity directly into porous structure. Likewise, lattice structures can be made to have any desired shape, size, number and aggregate strength and density in order to generate sufficient bonding strength to survive implantation and operation of porous structure, while permitting infusion of bone from lattice structures to promote osseointegration.

The porous structures described herein can have sufficient strength to support the forces during insertion. However, the greater the porosity of the structures, the weaker the porous structure becomes. Thus, the porous structure can have varying porosity to increase the strength and/or include reinforcement members as disclosed herein.

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A dental implant, comprising:
a non-porous head portion at a coronal end of the dental implant, the non-porous head portion having an interior portion extending apically from the non-porous head portion;
a non-porous apical portion at an apical end of the dental implant; and
a porous middle portion positioned between the non-porous head portion and the non-porous apical portion, the porous middle portion including a porous structure, wherein a porosity of the porous structure varies along a longitudinal axis of the non-porous head portion, the non-porous apical portion, and the porous middle portion, wherein the porous middle portion includes at least one thread, the at least one thread including a crest region, first and second flank regions on either side of the crest region, and first and second porous root regions extending from the first and second flank regions, respectively, wherein the first and second porous root regions, first and second flank regions, and crest region are adjacent to one another at a selected location along the at least one thread, wherein a porosity of the crest region is less than a porosity of each of the first and second porous root regions, and wherein a porosity of the thread extending from each of the first and second porous root regions to the crest region is non-uniform.

2. The dental implant of claim 1, wherein a first porosity of the porous structure proximal to the non-porous head portion is less than a second porosity proximal to the non-porous apical portion.

3. The dental implant of claim 1, wherein the entire threaded region comprises the porous structure.

4. The dental implant of claim 1, wherein a cross-section of the porous middle portion includes a non-porous core and wherein the porosity of the porous structure is non-uniform throughout the porous structure.

5. The dental implant of claim 1, wherein a cross-section of the porous middle portion includes one or more reinforcement members and wherein the porosity of the porous structure changes in a direction perpendicular to the longitudinal axis.

6. The dental implant of claim 5, wherein the reinforcement members extend from the non-porous head portion to the non-porous apical portion and wherein a first porosity proximal to an external surface of the porous structure is lower than a second porosity of an interior portion of the porous structure proximal to the longitudinal axis.

7. The dental implant of claim 1, wherein at least one of the non-porous head portion and the non-porous apical portion includes a thread and wherein a first porosity of the porous structure proximal to the non-porous head portion is less than a second porosity proximal to the non-porous apical portion.

8. The dental implant of claim 1, wherein the crest region and a portion of the first or second flank region are non-porous.

9. The dental implant of claim 1, wherein a porosity of the crest region of the thread is less than a porosity of each of the first and second flank regions.

10. A method of forming a dental implant, comprising:
using an additive manufacturing technique to form the dental implant including:

a non-porous head portion at a coronal end of the dental implant, the non-porous head portion having an interior portion extending apically from the non-porous head portion;

a non-porous apical portion at an apical end of the dental implant; and a porous middle portion positioned between the non-porous head portion and the non-porous apical portion, the porous middle portion including a porous structure, wherein a porosity of the porous structure varies along a longitudinal axis of the non-porous head portion, the non-porous apical portion, and the porous middle portion, wherein the porous middle portion includes at least one thread, the at least one thread including a crest region, first and second porous flank regions on either side of the crest region, and first and second root regions extending from the first and second porous flank regions, respectively, wherein the first and second root regions, first and second porous flank regions, and crest region are adjacent to one another at a selected location along the at least one thread, and wherein a porosity of the crest region is less than a porosity of each of the first and second porous flank regions.

11. The method of claim 10, wherein the additive manufacturing technique is selected laser melting additive manufacturing and wherein the porosity of the porous structure proximal to the non-porous head portion is less than the porosity proximal to the non-porous apical portion.

12. The method of claim 10 wherein the additive manufacturing technique is laser metal deposition additive manufacturing and wherein the porosity of the porous structure is non-uniform throughout the porous structure.

13. The method of claim 10, wherein the additive manufacturing technique is electron beam additive manufacturing and wherein the porosity of the porous structure changes in a direction perpendicular to the longitudinal axis.

14. The method of claim 10, wherein the porous middle portion includes a non-porous section and the porous structure.

15. The method of claim 10, further including:
machining at least one of the non-porous head portion, the non-porous apical portion, and the porous middle portion to form the thread on the porous middle portion, and wherein a porosity of the crest region is less than a porosity of the first and second root regions.

16. The method of claim 10, wherein a first porosity proximal to an external surface of the porous structure is lower than a second porosity of an interior portion of the porous structure proximal to the longitudinal axis and further including:

machining a portion of the non-porous head portion to include an abutment connection geometry.

17. A dental implant, comprising:

a non-porous head portion at a coronal end of the dental implant, the non-porous head portion having an interior portion extending apically from the non-porous head portion;

a non-porous apical portion at an apical end of the dental implant; and a porous middle portion positioned between the non-porous head portion and the non-porous apical portion, the porous middle portion including non-porous section and a porous structure, wherein a porosity of the porous structure varies along a longitudinal axis of the porous middle portion and wherein the non-porous head portion, non-porous apical portion, and porous middle porous are integral with each other and formed via an additive manufacturing method, wherein the porous middle portion includes at least one thread, the at least one thread including a crest region, first and second flank regions positioned on either side of the crest region, and first and second porous root regions extending from the first and second flank regions, respectively, wherein the first and second porous root regions, first and second flank regions, and crest region are adjacent to one another at a selected location along the at least one thread, wherein a porosity of the crest region is less than a porosity of one or both of the first and second porous root regions, and wherein a porosity of the thread extending from each of the first and second porous root regions to the crest region is non-uniform.

18. The dental implant of claim 17, wherein the non-porous section of the porous middle portion includes at least one reinforcement member extending within the porous structure from the non-porous head portion to the non-porous apical portion and wherein the porosity of the porous structure proximal to the non-porous head portion is less than the porosity proximal to the non-porous apical portion.

19. The dental implant of claim 17, wherein the non-porous section of the porous middle portion includes at least one threaded reinforcement member forming a portion of an external surface and extending from the non-porous head portion to the non-porous apical portion and wherein the porosity of the porous structure is non-uniform throughout the porous structure.

* * * * *